(12) United States Patent
Schlenker et al.

(10) Patent No.: US 11,460,052 B2
(45) Date of Patent: Oct. 4, 2022

(54) HYDRAULIC OSCILLATION MITIGATION SYSTEM FOR WORKING MACHINE

(71) Applicant: Caterpillar Paving Products Inc., Brooklyn Park, MN (US)

(72) Inventors: Brian J. Schlenker, Shoreview, MN (US); Derek P. Nieuwsma, Loretto, MN (US)

(73) Assignee: Caterpillar Paving Products Inc., Brooklyn Park, MN (US)

(*) Notice: Subject to any disclaimer, the term of this patent is extended or adjusted under 35 U.S.C. 154(b) by 358 days.

(21) Appl. No.: 16/774,201

(22) Filed: Jan. 28, 2020

(65) Prior Publication Data

US 2021/0231134 A1 Jul. 29, 2021

(51) Int. Cl.

| | |
|---|---|
| *B60G 21/067* | (2006.01) |
| *F15B 13/02* | (2006.01) |
| *E01C 23/088* | (2006.01) |
| *E01C 23/06* | (2006.01) |
| *F15B 13/06* | (2006.01) |
| *F15B 15/20* | (2006.01) |

(52) U.S. Cl.
CPC .......... *F15B 13/022* (2013.01); *B60G 21/067* (2013.01); *E01C 23/065* (2013.01); *E01C 23/088* (2013.01); *F15B 13/06* (2013.01); *F15B 15/204* (2013.01); *B60G 2202/30* (2013.01); *B60G 2300/09* (2013.01); *F15B 2211/4053* (2013.01); *F15B 2211/6303* (2013.01); *F15B 2211/7052* (2013.01); *F15B 2211/7656* (2013.01); *F15B 2211/783* (2013.01)

(58) Field of Classification Search
CPC .......... B60G 2202/30; B60G 21/073; B60G 21/067; B60G 21/06; E01C 23/065; E01C 23/088; E02F 9/2257
See application file for complete search history.

(56) References Cited

U.S. PATENT DOCUMENTS

| | | | |
|---|---|---|---|
| 3,767,351 A | 10/1973 | Blaser | |
| 4,371,182 A * | 2/1983 | Brown | B60G 17/0152 280/124.159 |
| 5,048,296 A | 9/1991 | Sunamura et al. | |
| 5,401,053 A * | 3/1995 | Sahm | B60G 17/016 267/221 |
| 6,270,098 B1 * | 8/2001 | Heyring | B60G 17/033 280/6.155 |
| 6,308,973 B1 | 10/2001 | Griebel et al. | |

(Continued)

FOREIGN PATENT DOCUMENTS

| | | |
|---|---|---|
| DE | 102006054122 | 5/2008 |
| GB | 1117089 | 6/1968 |
| KR | 100391590 | 7/2003 |

*Primary Examiner* — Thomas E Lazo

(57) ABSTRACT

A hydraulic system for controlling a hydraulic circuit of a working machine is disclosed. The hydraulic system can include a first hydraulic cylinder assembly, a second hydraulic cylinder assembly, a third hydraulic cylinder assembly and a valve. When coupled to the first hydraulic cylinder assembly and the second hydraulic cylinder assembly, the third hydraulic cylinder assembly can be configured to control a flow of a hydraulic fluid between the first hydraulic cylinder assembly and the second hydraulic cylinder assembly to limit an extent of travel of the first piston and an extent of travel of the second piston.

19 Claims, 8 Drawing Sheets

(56) References Cited

U.S. PATENT DOCUMENTS

| | | | |
|---|---|---|---|
| 6,604,034 B1 * | 8/2003 | Speck | B60G 21/073 |
| | | | 280/5.506 |
| 6,666,125 B2 | 12/2003 | Gunzenhauser | |
| 6,886,837 B2 | 5/2005 | Gibbs | |
| 6,942,230 B1 * | 9/2005 | Fontdecaba Buj | B60G 11/16 |
| | | | 280/124.106 |
| 7,168,720 B2 * | 1/2007 | Fontdecaba Buj | B60G 21/06 |
| | | | 280/124.159 |
| 7,360,777 B2 * | 4/2008 | Mizuno | B60G 21/10 |
| | | | 280/5.506 |
| 7,828,309 B2 | 11/2010 | Berning et al. | |
| 8,123,235 B2 * | 2/2012 | Monk | B60G 21/06 |
| | | | 280/124.161 |
| 2018/0072126 A1 * | 3/2018 | Sawai | F16F 9/061 |
| 2020/0122538 A1 | 4/2020 | Engelmann et al. | |

* cited by examiner

HYDRAULIC OSCILLATION MITIGATION SYSTEM FOR WORKING MACHINE

TECHNICAL FIELD

The present application relates generally, but not by way of limitation, to hydraulic systems for working machines, and more particularly to a hydraulic oscillation mitigation system for rotary mixer machines or cold planer machines that can be used to remove or recycle paved surfaces.

BACKGROUND

Rotary mixer machines and cold planer machines can be used to mill or grind-up old or degraded pavement from surfaces such as roadways and parking lots. Cold planers can be configured to remove the pavement for transportation away from the surface, while rotary mixers can be configured to reconstitute or recycle the pavement for reuse at the surface. The surfaces can extend over uneven terrain. As such, these machines can include systems for adjusting the vertical height of the machine and a rotary cutting tool attached thereto in order to, for example, control the cutting depth and provide a smooth ride for the operator.

Suspension systems for ride control have been developed. U.S. Pat. No. 6,308,973 to Griebel et al., entitled "SUSPENSION SYSTEM WITH AXLE OSCILLATION CIRCUIT" is an exemplary of one such suspension system.

BRIEF SUMMARY

Figure 1:
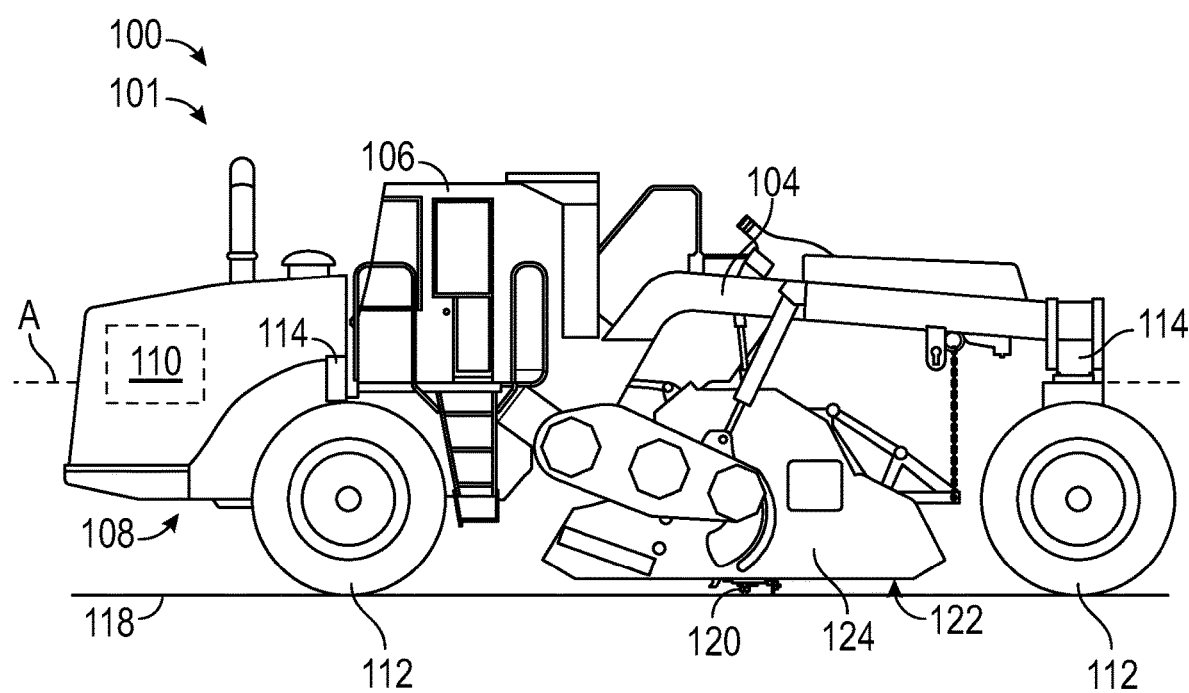
FIG. 1 is a schematic side view of a working machine comprising a rotary mixer having a plurality of transportation devices mounted to lifting columns according to an example of the present application.

In an example, a hydraulic system for controlling a hydraulic circuit of a working machine is disclosed. The hydraulic system can optionally comprise a first hydraulic cylinder assembly, a second hydraulic cylinder assembly, a third hydraulic cylinder assembly and a valve. The first hydraulic cylinder assembly can have a first piston and a first rod for coupling to a first propulsor of the working machine. The second hydraulic cylinder assembly can have a second piston and a second rod for coupling to a second propulsor of the working machine. The third hydraulic cylinder assembly can have at least a third piston. The first valve can be configured to selectively fluidly couple the third hydraulic cylinder assembly to the first hydraulic cylinder assembly and the second hydraulic cylinder assembly. When coupled to the first hydraulic cylinder assembly and the second hydraulic cylinder assembly, the third hydraulic cylinder assembly can be configured to control a flow of a hydraulic fluid between the first hydraulic cylinder assembly and the second hydraulic cylinder assembly to limit an extent of travel of the first piston and an extent of travel of the second piston.

In another example, working machine comprising one of a rotary mixer or a cold planar is disclosed. The working machine can optionally comprise a frame, a rotor, a propulsion system, a first leg, a second leg and a hydraulic system. The rotor can be coupled to the frame and can be configured to rotate relative thereto. The propulsion system can include a plurality of propulsors, the propulsion system can be configured to move the working machine. The first leg can be coupled to the frame and having a first hydraulic cylinder assembly as a part thereof. The first leg via the first hydraulic cylinder assembly can be configured to lift the frame relative to the first propulsor. The second leg can be coupled to the frame and can have the second hydraulic cylinder assembly as a part thereof. The second leg via the second hydraulic cylinder assembly can be configured to lift the frame relative to the second propulsor. The hydraulic system can include the first hydraulic cylinder assembly having a first piston and the second hydraulic cylinder assembly having a second piston. The hydraulic system can further optionally comprise a flow control device and a first valve configured to selectively fluidly couple the third hydraulic cylinder assembly to the first hydraulic cylinder assembly and the second hydraulic cylinder assembly. When coupled to the first hydraulic cylinder assembly and the second hydraulic cylinder assembly, the flow control device can be configured to control a flow of a hydraulic fluid between the first hydraulic cylinder assembly and the second hydraulic cylinder assembly to limit an extent of travel of the first piston and an extent of travel of the second piston.

DETAILED DESCRIPTION

The description set forth below in connection with the appended drawings is intended as a description of various embodiments of the described subject matter and is not necessarily intended to represent the only embodiment(s). In certain instances, the description includes specific details for the purpose of providing an understanding of the described subject matter. However, it will be apparent to those skilled in the art that embodiments may be practiced without these specific details. In some instances, well-known structures and components may be shown in block diagram form in order to avoid obscuring the concepts of the described subject matter. Wherever possible, the same reference numbers will be used throughout the drawings to refer to the same or the like parts.

Any reference in the specification to "one embodiment", "an embodiment", "an example" or "one example" means that a particular feature, structure, characteristic, operation, or function described in connection with an embodiment is included in at least one embodiment. Thus, any appearance of the phrases above phrases in the specification is not necessarily referring to the same embodiment. Further, the particular features, structures, characteristics, operations, or functions may be combined in any suitable manner in one or more embodiments, and it is intended that embodiments of the described subject matter can and do cover modifications and variations of the described embodiments.

It must also be noted that, as used in the specification, appended claims and abstract, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top" "bottom," "front," "rear," "side," "height," "length," "width," "upper," "lower," "interior," "exterior," "inner," "outer," and the like that may be used herein, merely describe points of reference and do not necessarily limit embodiments of the described subject matter to any particular orientation or configuration. Furthermore, terms such as "first," "second," "third," etc. merely identify one of a number of portions, components, points of reference, operations and/or functions as described herein, and likewise do not necessarily limit embodiments of the described subject matter to any particular configuration or orientation.

The terms "substantially", "about", "generally" or variations thereof are understood to mean within +/−10 percent or +/−10 degrees of the provided value whatever is applicable.

FIG. 1 is a schematic side view of a working machine 100 comprising a rotary mixer 102 according to an example of the present disclosure. It will be appreciated that the embodiments of the present disclosure can be similarly applied to other types of machines, such as, but not limited to, a road milling machine, a road reclaimer, a cold planer, and the like. Similarly, the application of such machines is not limited to road reclamation or road milling.

According to the example of FIG. 1, the rotary mixer 102 includes a frame 104 and an operator cab 106 mounted on the frame 104. The operator cab 106 may include control elements, for controlling various operations of the rotary mixer 102.

The frame 104 can also be coupled with a power train 108 e.g., gearbox, shafts, power source 110, etc.). The power source 110 can comprise an internal combustion engine, an electric motor, a generator, a power storage device including batteries, a hybrid engine, or a combination of two or more of the foregoing power sources.

The machine 100 can have transportation devices 112, which, as described below, can comprise wheels, tracks, or other moveable ground engaging devices. Thus, in some embodiments, the transportation devices 112 can comprise metal chain-link tracks, rubber tracks, pneumatic tires, inflatable rubber tires, hard tires and the like. Each of the transportation devices 112 can be connected to frame 104 via a corresponding one of a plurality of lifting columns 114. The transportation devices 112 can be configured to support the frame 104 on a ground surface 118, and also aid in propelling the rotary mixer 102 on the ground surface 118 in a desired direction and at a desired speed.

The frame 104 can longitudinally extend between first (front) end and second (rear) end along frame axis A. A rotor assembly 120 comprising part of a milling system 122 can, for example, be coupled to the underside of frame 104. This rotor assembly 120 and milling system 122 can be moveable relative to the frame 104 and the ground surface 118 or can be fixed relative to the frame 104 in some instances. The rotor assembly 120 and other parts of milling system 122 can be driven by the power train 108 to move and can be configured to selectively engage the ground surface 118 for milling, reclamation, etc.

The frame 104 can be supported by the transportation devices 112 via the lifting columns 114. The lifting columns 114 (also called legs herein) can be configured to raise and lower the frame 104 relative to the transportation devices 112 and the ground surface 118. One or more of the lifting columns 114 can be configured to rotate along a vertical axis, e.g. perpendicular to axis A, to provide steering for the rotary mixer 102.

The rotary mixer 102 can comprise have four separate of the transportation devices 112: a front left transportation device, a front right transportation device, a rear left transportation device and a rear right transportation device, each of which can be connected to one of the lifting columns 114. That is, additional propulsion devices 112 and lifting columns 114 can be provided adjacent propulsion devices 112 shown in FIG. 1 further into the plane of FIG. 1. The present disclosure is not limited to any particular number of propulsion devices or lifting columns.

The lifting columns 114 can be provided to raise and lower the frame 104 to, for example, control a cutting depth of rotor assembly 120 and to accommodate the rotary mixer 102 engaging obstacles on the ground. As described herein, the lifting columns 114 and other components of the machine 100 can be coupled to a control system as further discussed in reference to FIGS. 3-6.

The rotary mixer 102 can further include rotor assembly 120 and milling system 122. These can be connected to frame 104. The milling system 122 can comprise the rotor assembly 120 operatively connected to the power source 110 for rotation. The rotor assembly 120 can comprise a milling drum, cutting drum, cold planning drum, mixing drum or the like. The rotor assembly 120 can include a plurality of cutting tools, such as chisels, disposed thereon. The rotor assembly 120 can be rotated about a drum or housing axis extending in a direction perpendicular to frame axis A into the plane of FIG. 1. As the rotor assembly 120 spins or rotates about drum axis, the cutting tools can engage the ground surface 118, which can comprise the ground, dirt, asphalt or concrete for example, of existing work areas, roadways, bridges, parking lots and the like. Moreover, as the cutting tools engage the ground surface 118, the cutting tools engage layers of materials forming the ground surface 118, such as hardened dirt, rock or pavement and displace the layers for removal or mixing. The spinning action of rotor assembly 120 and the cutting tools then transfers the material of the ground surface 118 through a mixing chamber 124 to be redeposited on the ground. The mixing chamber 124 can be defined by various plates positioned around the rotor assembly 120.

Put another way the rotor assembly 118 can be configured to selectively contact the ground surface 118 during travel of the machine to reclaim and/or pulverize the ground surface 118, such as by mixing reclaimed soil or paving material with various additives or aggregates deposited on the work surface. Thus, the rotary mixing machine 102 of the present application can include systems for depositing an additive, such as Portland cement, lime, fly ash, cement kiln dust, etc., on the work surfaces during the reclaiming or pulverizing operations.

During the course of moving over the ground surface 118, either with the rotor assembly 120 engaging the ground surface 118 in a milling operating mode or with the rotor assembly 120 retracted to a transport or ride operating mode, the transportation devices 112 can be subject to different topography due to hills, valleys, depressions, etc. Such topography can cause one or more rods or pistons of lifting columns 114 to be pushed inward into a cylinder of lifting columns 114 and/or to extend further outward from the cylinder relative to one another, as a hydraulic system operates to redistribute hydraulic fluid within the system to each cylinder, balance loads and keep the frame 104 somewhat level.

Figure 2:
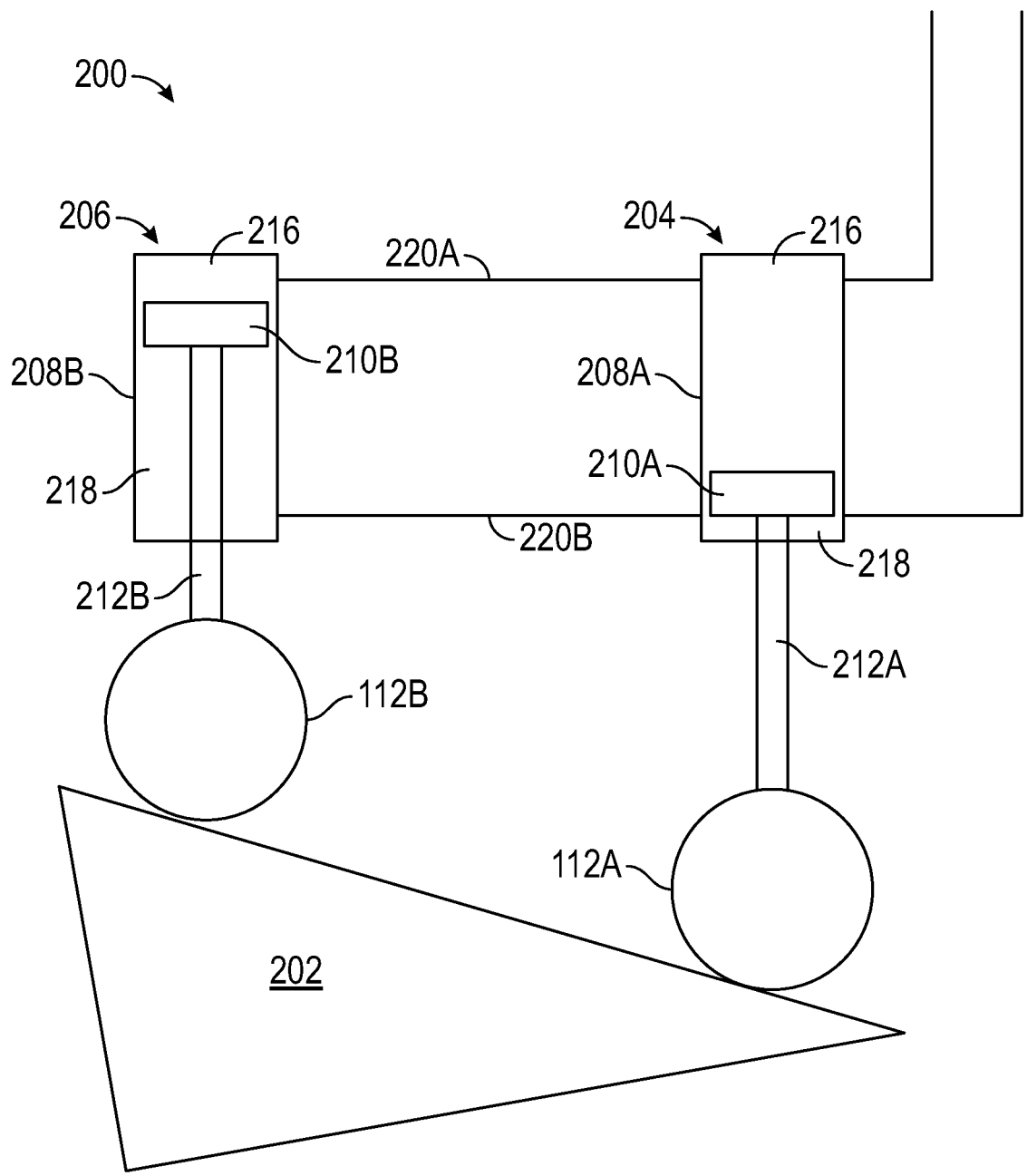
FIG. 2 is a diagrammatic view of a system including two of the transportation devices each connected to one of the lifting columns that are operatively connected to a first hydraulic system according to an example of the present application.

FIG. 2 provides and example of a hydraulic system 200 subject to topography comprising a hill 202. The hydraulic system 200 can include a first hydraulic cylinder assembly 204 (sometimes called a first hydraulic device herein) and a second hydraulic cylinder assembly 206 (sometimes called a second hydraulic device herein). The first hydraulic cylinder assembly 204 can include a cylinder 208A, a piston 210A and a rod 212A. The second hydraulic cylinder assembly 206 can include a cylinder 208B, a piston 210B and a rod 212B.

The first hydraulic cylinder assembly 204 can be fluidly coupled to the second hydraulic cylinder assembly 206 such as via one or more fluid lines 220A and 220B. The first hydraulic cylinder assembly 204 can be part of one of the lifting columns 114 of FIG. 1. Similarly, the second hydraulic cylinder assembly 206 can be part of another one of the lifting columns 114 of FIG. 1. It is contemplated that the first hydraulic cylinder assembly 204 and the second hydraulic cylinder assembly 206 can be part of any combination of the lifting columns 114 of FIG. 1. Thus, they can be for the two of the rear lifting columns, the two front lifting columns, the two left side lifting columns or the two right side lifting columns, for example.

FIG. 2 schematically shows the rod 212A can be coupled to a first propulsion device 112A of the plurality of propulsion devices 112 previously shown in FIG. 1. Similarly, the rod 212B can be coupled to a second propulsion device 112B of the plurality of propulsion devices 112. The rods 212A and 212B can extend from respective ones of the cylinders 208A and 208B and can extend to couple with respective ones of the propulsion devices 112. It should be noted that the rod 212A and rod 212B may not be directly coupled to the respective first and second propulsion devices 112A, 112B but can be indirectly coupled thereto by other components of the lifting columns that are not specifically illustrated. Thus, the coupling of the rods 212A, 212B to the respective first and second propulsion devices 112A, 112B is simplified in FIG. 2.

The first and second hydraulic cylinder assembly 204 and 206 can each be designed as double-acting working cylinder. As such, each has a piston-side first working chamber 216, 218, respectively, and a piston rod-side second working chamber 218, 218, respectively. These working chambers 216, 218 can be separated from one another by the respective piston 210A, 210B located in the respective cylinder 208A, 208B, The first and the second working chambers 216, 218 can be filled with a pressure medium, which can be for example a hydraulic fluid such as but not limited to oil. Filling of the first working chambers or an emptying of the second working chamber can cause a lowering or raising of the frame from the ground.

The first and second hydraulic cylinder assembly 204 and 206 can be fluidly connected to one another via fluid lines 220A and 220B. Alternatively, the first and second hydraulic cylinder assembly 204 and 206 can be fluidly connected to one another via a raise/lower valve(s). The raise/lower valve is described and shown with regard to subsequent FIGURES. Fluid lines 220A and 220B can permit power from first hydraulic cylinder assembly 204 to be transferred to the second hydraulic cylinder assembly 206 by maintaining pressurized engagements.

FIG. 2 illustrates as situation where the machine is operating (either in a drive mode or a milling mode) on the hill 202. Such a situation can cause the rod 212A and the piston 210A of the first hydraulic cylinder assembly 204 to be pushed inward into the cylinder 208A toward the frame relative to the rod 212B and the piston 210B of the second hydraulic cylinder assembly 206. Put another way, the rod 212B and the piston 2103 can extend further outward from the cylinder 208B toward the ground (here hill 202) relative to the rod 212A and the piston 210A of the first hydraulic cylinder assembly 204. FIG. 2 shows a situation where the rod 212A and piston 210A are near a full displacement position relative to the cylinder 208A and the rod 212E and the piston 210B are at the full displacement position relative to the cylinder 208B. Each of the first hydraulic cylinder assembly 204 and the second hydraulic cylinder assembly 206 can have two full displacement positions, one with the piston and rod retracted and one with the piston and rod extended.

In an extreme situation such as the one of FIG. 2, the rods 212A, 212B and pistons 210A, 210B move/oscillate toward, to the full displacement position (also called a full extent position, full stroke position, full travel position, end of stroke position or full stroke position herein). As used herein the term "oscillate" or "oscillation" means a gross movement of the piston and rod of one of the hydraulic cylinder assemblies relative to the cylinder of that assembly or a gross movement of the piston and rod of one of the hydraulic cylinder assemblies relative to the piston and rod of another one of the hydraulic cylinder assemblies. This movement as illustrated in FIG. 2 can prevent or reduce unintended frame loading and/or keep the frame level for operator comfort. However, if movement/oscillation is too extreme in nature (i.e. with one or more of the rods and pistons moved to a full displacement position), this situation can result in unwanted frame loading. This unintended frame loading can make it difficult to maintain a desired slope of the machine, for example. It should be noted that the rods 212A, 212B and pistons 210A, 210B can move/oscillate to the full displacement position as a result of other circumstances in addition to topography such as from obstacles or operator induced criteria (e.g., a desire to mill at a slope or tilt for example). Thus, the full displacement position need not be a result of topography in some cases. Indeed, it is recognized that the present apparatuses, systems and methods can help prevent unintended frame loading and make the machine more stable. This should be contrasted with as the systems and methods in co-pending U.S. application Ser. No. 16/658, 996, entitled "RIDE CONTROL SYSTEMS AND METHODS FOR ROTARY CUTTING MACHINES", filed Oct. 21, 2019, the entire specification of which is incorporated herein by reference in its entirety, which address machine vibration.

The present application is directed to apparatuses, systems and methods for monitoring and controlling movements of the piston 210A, 210B and rod 212A, 212B to, for example, can help prevent unintended frame loading and make the machine more stable as a result of the hydraulic system while maintaining orientation of frame 104 (FIG. 1), and maintaining a desired cut characteristics of the rotor assembly 120 (FIG. 1), for example. In particular, the present disclosure provides various examples as further illustrated in FIGS. 3-6, that can utilize a valve and a third hydraulic cylinder assembly (sometimes called a flow control device, a third hydraulic device or an intermediate element herein). This third hydraulic cylinder assembly can include a free-floating piston, piston and rod assembly, gas-compressing piston and/or dual-diameter cylinder device, for example. The third hydraulic cylinder assembly can automatically operate to or can operate with a controller as further described in FIG. 6 to limit an extent of travel of the piston and rod within the cylinder of the first hydraulic cylinder assembly and second hydraulic cylinder assembly, respectively. Such a limit to the extent of travel of the piston and rod can maintain the piston and rod at a desired position such as substantially the full displacement position, the full displacement position, or a position less than the full displacement position e.g., between 85% and 99.9% of the full displacement position), or another position, for example.

Figure 3:
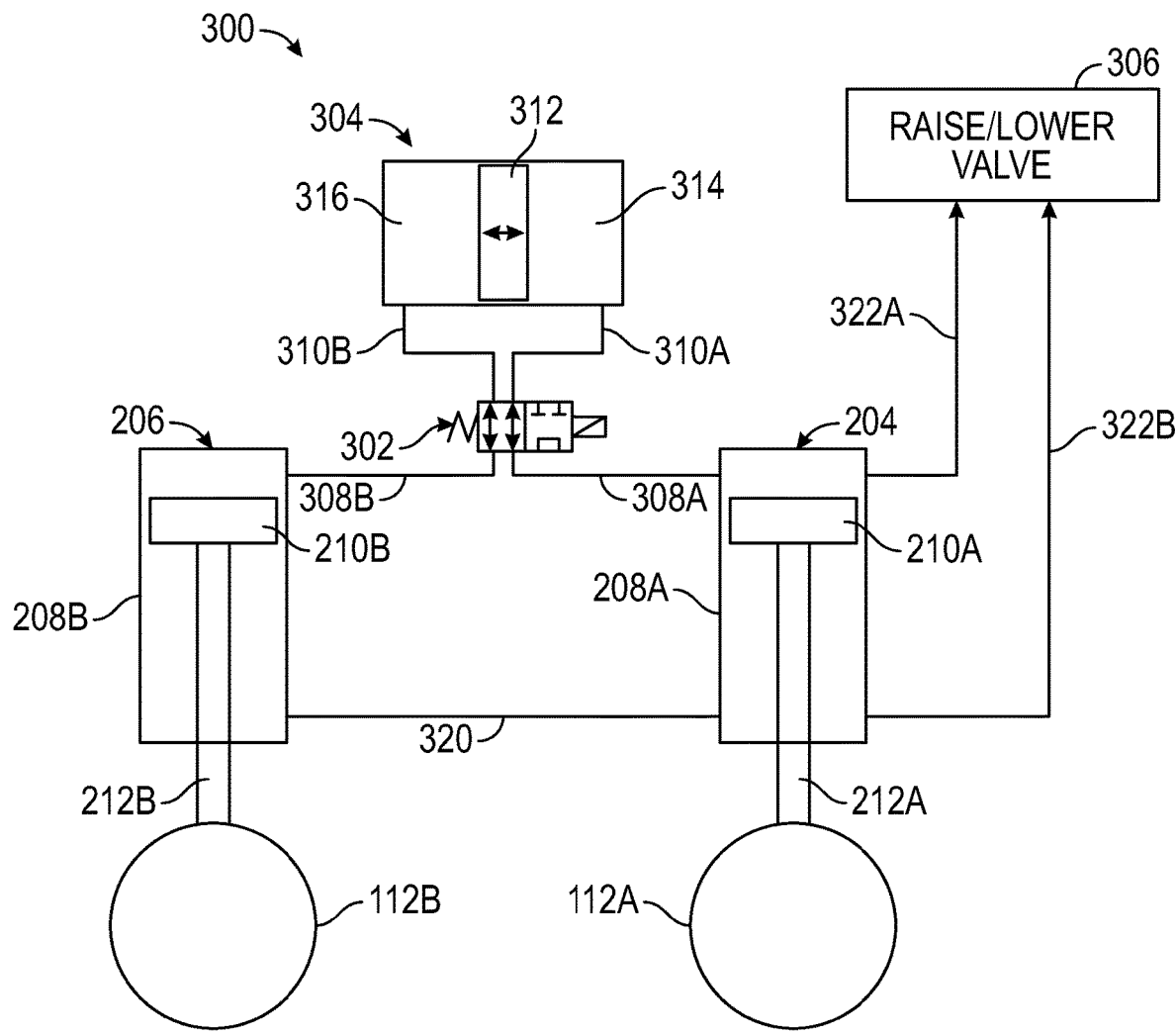
FIG. 3 is a diagrammatic view of a second system including two of the transportation devices each connected to one of the lifting columns that are operatively connected to a second hydraulic system according to an example of the present application.

FIG. 3 is a diagrammatic view of a second embodiment of a hydraulic system 300. In addition to the first hydraulic cylinder assembly 204, the second hydraulic cylinder assembly 206 that are part of and coupled to respective ones of the lifting columns as previously illustrated and described, the system 300 includes the transportation devices 112A and 112B, a valve 302, a third hydraulic cylinder assembly 304 and a raise/lower valve 306.

The construction of the first and second hydraulic cylinder assembly 204 and 206 are previously described. The first hydraulic cylinder assembly 204 can be selectively fluidly coupled/connected to the second hydraulic cylinder assembly 206 by the valve 302. The valve 302 can be positioned between the first hydraulic cylinder assembly 204 and the second hydraulic cylinder assembly 206 and can be in fluid communication therewith via fluid lines 308A and 308B.

According to one example, the valve 302 can comprise a proportional 4-way, 2-position valve. The valve 302 can comprise a flow control device configured to directly or indirectly fluidly couple the first hydraulic cylinder assembly 204 with the second hydraulic cylinder assembly 206 and the third hydraulic cylinder assembly 304 with the first and second hydraulic cylinder assembly 204 and 206 as further discussed herein.

According to one operational mode or setting, the valve 302 can be configured in a first setting to allow the first and second hydraulic cylinder assembly 204 and 206 to communicate directly via the lines 308A and 308B. This configuration can be performed/used in combination with the raise/lower valve 306 being actuated open to allow for hydraulic fluid flow to the first and second hydraulic cylinder assembly 204 and 206 to perform a raise and/or lower of the frame of the working machine, for example.

The valve 302 can also be fluidly coupled to the third hydraulic cylinder assembly 304 via fluid lines 310A and 310B. The valve 302 can be configured in a second setting or operation mode to allow the first and second hydraulic cylinder assembly 204 and 206 to communicate indirectly via the lines 310A and 310B and the third hydraulic cylinder assembly 304. This configuration can be performed/used with the raise/lower valve 306 being actuated closed, for example.

The third hydraulic cylinder assembly 304 can be constructed in a similar manner as the first hydraulic cylinder assembly 204 and the second hydraulic cylinder assembly 206 previously described. However, as shown in FIG. 3, the third hydraulic cylinder assembly 304 can differ in that it can be rod-less and can have a floating piston 312 for example.

The third hydraulic cylinder assembly 304 can include a cylinder in addition to the piston 312. The piston 312 can divide the third hydraulic cylinder assembly 304 into a first working chamber 314 communicating fluidly with the line 310A and a second working chamber 316 communicating fluidly with the line 310B. These working chambers 314 and 316 can be constructed similar to those previously described in regard to the first hydraulic cylinder assembly 204 and the second hydraulic cylinder assembly 206. The volume of the working chamber 314 and the volume of the working chamber 316 can be set to control/limit a degree or extent of travel of the piston 210A, 210B and the rod 212A, 212B. Put another way, the third hydraulic cylinder assembly 304 can be configured to control a flow of the hydraulic fluid between the first hydraulic cylinder assembly 204 and the second hydraulic cylinder assembly 206 to limit an extent of travel of the first piston 210A and an extent of travel of the second piston 210B within respective cylinders 208A and 208B. In this manner, the third hydraulic cylinder assembly 304 can be used to limit/control the piston 210A, 210B and rod 212A, 212B to substantially the full displacement position or another desired position. Such desired position can be the full displacement position, a position that is less than the full displacement position (e.g., between 85% and 99.9% of the full displacement position) or to another position, for example. As discussed previously, the hydraulic cylinder assembly 304 can be utilized conditionally such as only after closing of the raise/lower valve 306, for example.

Fluid line(s) 320 can fluidly couple the first hydraulic cylinder assembly 204 and the second hydraulic cylinder assembly 206 and fluid lines 322A and 322B can fluidly couple the valve 306 with at least the first hydraulic cylinder assembly 204. It should be noted that in alternative examples such as the one illustrated in FIG. 7, the fluid line 320 could be eliminated and the first hydraulic cylinder assembly 204 and the second hydraulic cylinder assembly 206 can be fluidly coupled at the raise/lower valve 306 (or a port of a tank fluidly coupled to the raise/lower valve 306). The system 300 can comprise a closed system comprised of fluid lines, the valves 302, 306 and the first, second and third hydraulic cylinder assemblies 204, 206 and 304. It should be noted, for example, that although as single raise/lower valve 306 is illustrated connected in series with the first, second and third hydraulic cylinder assemblies 204, 206 and 304 it is contemplated that multiple raise/lower valves can be utilized according to some examples. For example, one embodiment can have a raise/lower valve for each of the lifting columns (e.g., one for first hydraulic cylinder assembly 204 and another for the second hydraulic cylinder assembly 206). One such embodiment is illustrated herein with FIG. 7.

Figure 4:
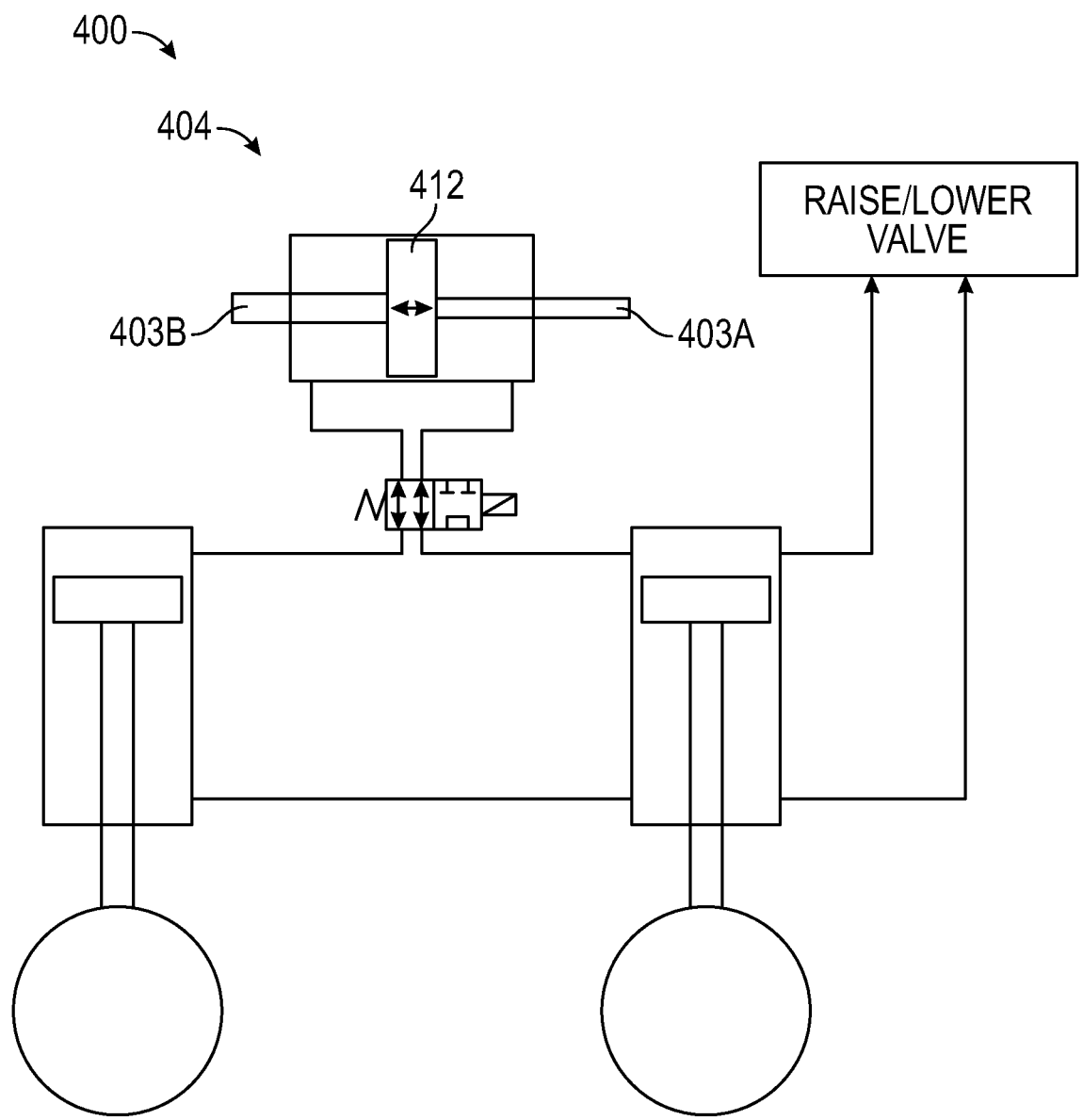
FIG. 4 is a diagrammatic view of a third system including two of the transportation devices each connected to one of the lifting columns that are operatively connected to a third hydraulic system according to an example of the present application.

FIG. 4 is a diagrammatic view of a third embodiment of a hydraulic system 400. The hydraulic system 400 can be substantially similar to or the same as the hydraulic system 300 of FIG. 3 save that a third hydraulic cylinder assembly 404 of the system 400 can be constructed to include a first rod 403A and a second rod 403B. Thus, unlike the third hydraulic cylinder assembly 304, which utilized the floating piston 312, a piston 412 of the third hydraulic cylinder assembly 404 can be coupled to the first rod 403A on a first side thereof and the second rod 403B on a second side thereof. The rods 403A and 403B can extend outward of the cylinders of the third hydraulic cylinder assembly 404 as illustrated in FIG. 4. According to some examples, the first rod 403A can have a diameter and/or shape that differs from a diameter and/or shape of the second rod 403B. Such a configuration can bias the third hydraulic cylinder assembly 404 and the system 400 in a desired manner to influence travel of the piston of one of the first hydraulic cylinder assembly 204 relative to the piston of the second hydraulic cylinder assembly 206, for example.

Figure 5:
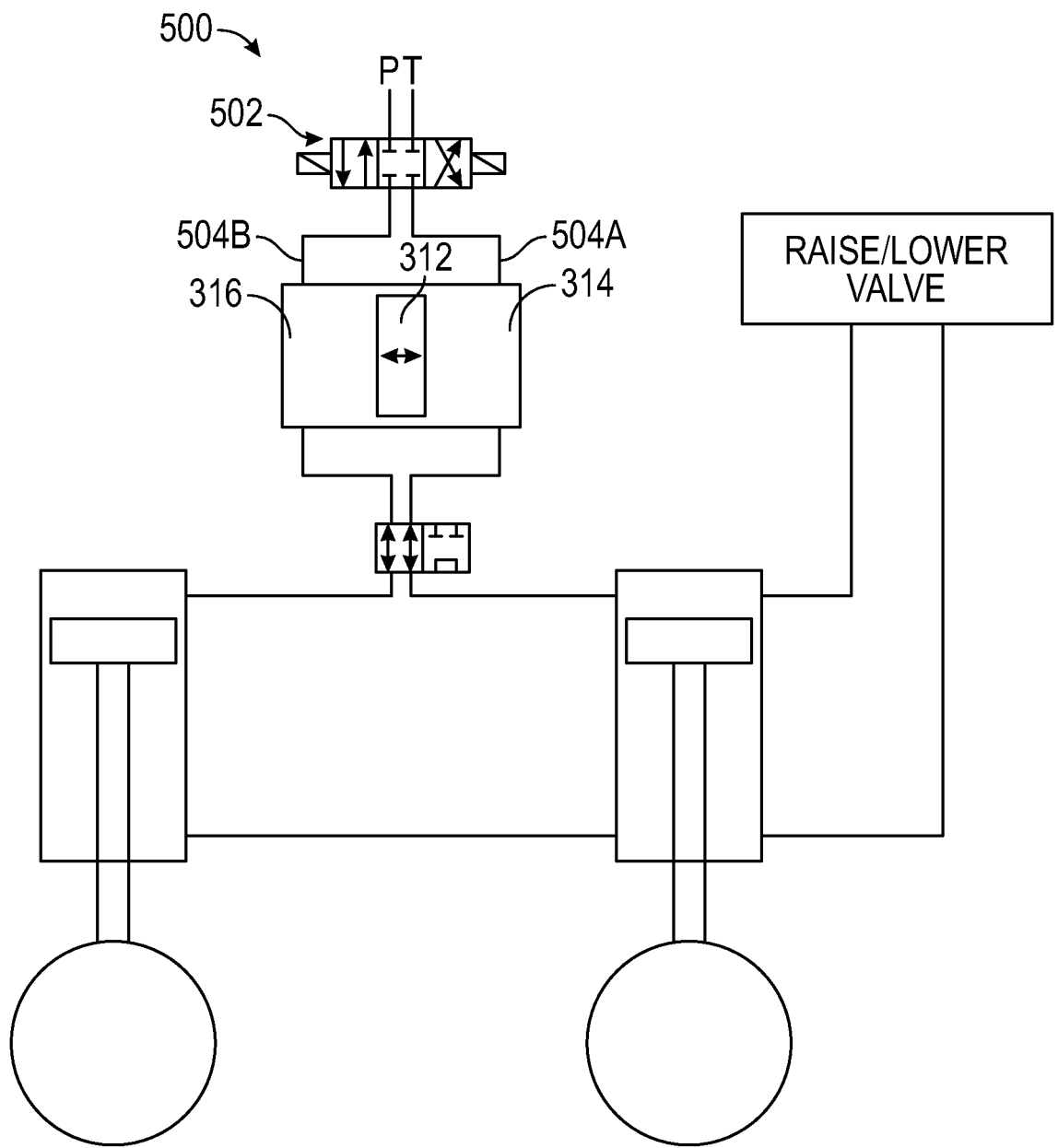
FIG. 5 is a diagrammatic view of a fourth system including two of the transportation devices each connected to one of the lifting columns that are operatively connected to a fourth hydraulic system according to an example of the present application.

FIG. 5 is a diagrammatic view of a fourth embodiment of a hydraulic system 500. The hydraulic system 500 can be substantially similar to or the same as the hydraulic system 300 of FIG. 3 save that the system 500 can include a second valve 502 configured to selectively fluidly communicate hydraulic fluid with the third hydraulic cylinder assembly 304. The system 500 can also include fluid lines 504A and 504B as additional features. The fluid line 504A can fluidly communicate with the volume of the working chamber 314 and the fluid line 504B can fluidly communicate with the volume of the working chamber 316.

The valve 502 can comprise a proportional 4-way, 3-position valve. The valve 502 can comprise a flow control device configured to selectively open and close to fluidly couple the third hydraulic cylinder assembly 306 with a reservoir and source (indicated as pressure source "P" and tank "T") via the fluid lines 504A and 504B.

The valve 502 can be configured to selectively open and/or close to pressurize one of the working chamber 314 or the working chamber 316 relative to the other of the working chamber 314 or the working chamber 316 to adjust a positioning of the floating piston 312. Alternatively or additionally, proportional pressure reducing valves (not shown) can be used to center the floating piston 312 based on pressure in the cylinders of the first hydraulic cylinder assembly 204 and the second hydraulic cylinder assembly 206. This adjustment can re-zero or re-position the piston 312 as desired. Although illustrated with the floating piston 312 the configuration of FIG. 5 can also be utilized with the system of FIG. 4 having the rods as part of the third hydraulic cylinder assembly in some embodiments.

It is contemplated that embodiments such as those of FIGS. 3-5 can operate passively without a need for active control to limit travel of the piston of one of the first hydraulic cylinder assembly 204 and the piston of the second hydraulic cylinder assembly 206 as previously described. However, active control using a controller such as described in FIG. 6 is also contemplated for use with any of the disclosed embodiments.

Figure 6:
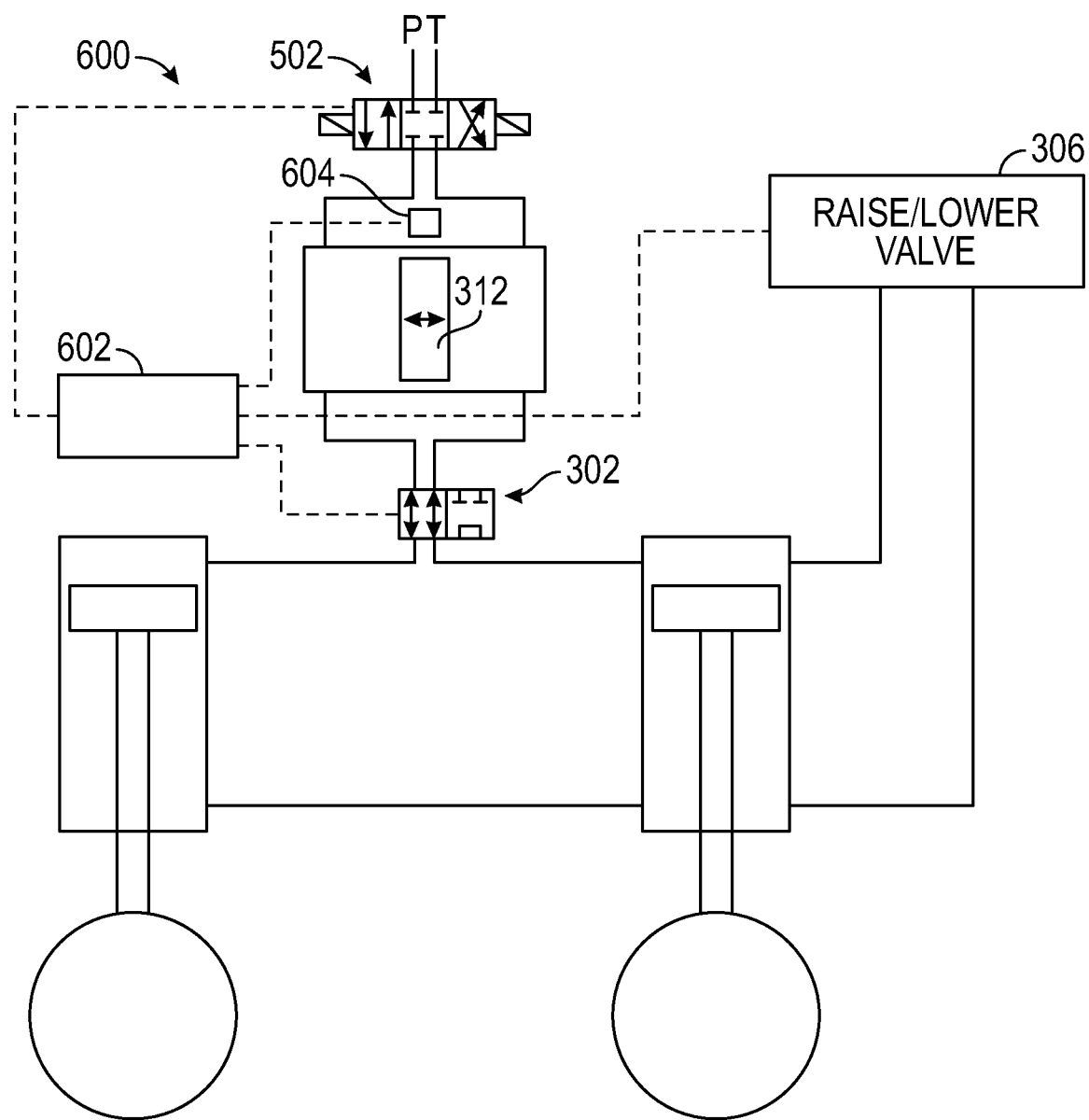
FIG. 6 is a diagrammatic view of a fifth system including two of the transportation devices each connected to one of the lifting columns that are operatively connected to a fifth hydraulic system according to an example of the present application.

FIG. 6 is a diagrammatic view of a fifth embodiment of a hydraulic system 600. The hydraulic system 600 can be substantially similar to or the same as the hydraulic system 500 of FIG. 5 save that the system 600 can additionally include a controller 602 and a sensor 604. The controller 602 can electronically communicate with the sensor 604. Additionally, the controller 602 can electronically communicate with the valves 502, 302 and/or 306 to selectively open or close the valves 502, 302 and/or 306 as previously described.

According to one example, the sensor 604 can be configured as a position sensor to sense a position of the piston 312 within the cylinder of the third hydraulic cylinder assembly 304. The controller 602 can be configured to selectively operate the second valve 502 based on input (e.g. position data) from the sensor 604 to change a position of the piston 312 within the third hydraulic cylinder assembly 304. This scheme can allow the piston 312 to be re-positioned within the cylinder of the third hydraulic cylinder assembly 304 such as to achieve a zeroed position as illustrated, or another desired position.

The controller 602 can comprise one or more processors, microprocessors, microcontrollers, electronic control modules (ECMs), electronic control units (ECUs), programmable logic controller (PLC) or any other suitable means for electronically controlling functionality.

Controller 602 can be configured to operate according to a predetermined algorithm or set of instructions for controlling at least some of the functions of the machine 10 such as those previously described. Such an algorithm or set of instructions can be stored in database, can be read into an on-board memory of controller 602, or preprogrammed onto a storage medium or memory accessible by controller 602, for example, in the form of a floppy disk, hard drive, optical medium, random access memory (RAM), read-only memory (ROM), or any other suitable computer readable storage medium commonly used in the art (each referred to as a "database"), which can be in the form of a physical, non-transitory storage medium.

According to some examples, the controller 602 can be in electronic communication with various other components, systems or sub-systems of the machine 10 such as the drive system, etc. Thus, according so some examples, the controller 602 can communicate electronically with various controllers, systems and components (e.g., an engine, a hydraulic motor, hydraulic systems including those previously discussed), among other elements. By way of such electronic communication, controller 602 can receive data pertaining to the current operating parameters of the machine 10 from sensors, such as the position sensor 604 of the system 600. In response to such input, controller 602 can perform various determinations and transmit output signals corresponding to the results of such determinations or corresponding to actions that need to be performed, such as for re-positioning the piston 312 as previously described.

Figure 7:
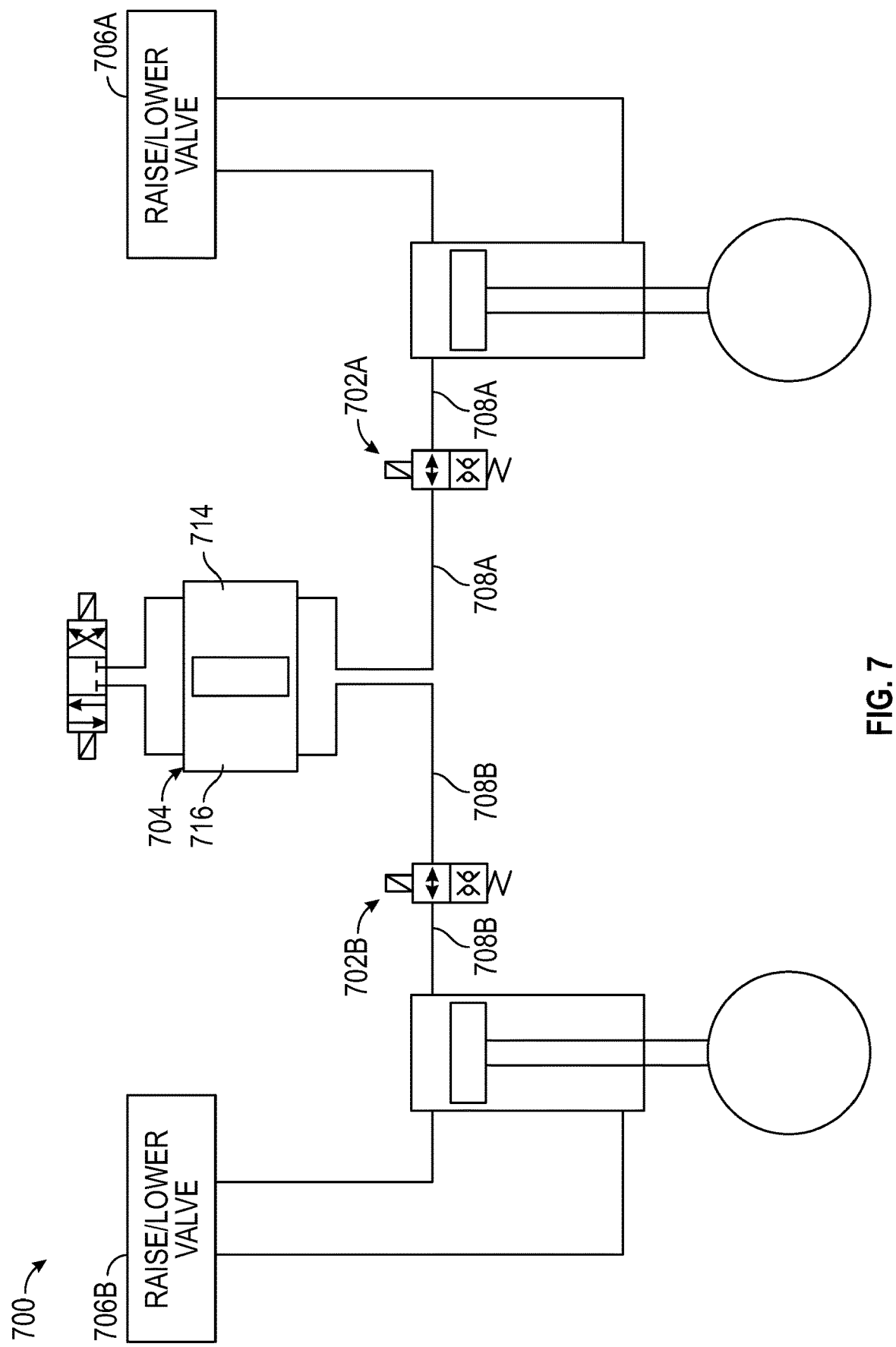
FIG. 7 is a diagrammatic view of a sixth system including two of the transportation devices each connected to one of the lifting columns that are operatively connected to a sixth hydraulic system according to an example of the present application.

FIG. 7 is a diagrammatic view of sixth embodiment of a hydraulic system 700. The hydraulic system 700 can be substantially similar to or the same as the hydraulic systems 500 and 600 of FIGS. 5 and 6 save that the system 700 can include two second valves 702A and 702B configured to independently and selectively fluidly communicate hydraulic fluid with the third hydraulic cylinder assembly 704. The system 700 can also include separate raise/lower valves 706A and 706B. A fluid line 708A can fluidly communicate with the volume of the working chamber 714 of the third hydraulic cylinder assembly 704 and the fluid line 708B can fluidly communicate with the volume of the working chamber 716. The valves 702A and 702B can regulate hydraulic fluid communication along the respective fluid lines 708A and 708B.

FIG. 7 shows the system 700 can have one raise/lower valve 706A, 708B for each of the lifting columns (e.g., one raise/lower valve 706A fluidly coupled to the first hydraulic cylinder assembly 204 and another raise/lower valve 706B fluidly coupled to the second hydraulic cylinder assembly 206). The raise/lower valve 706A and the raise/lower valve 706B can both be connected to a same hydraulic tank (not shown), or different hydraulic tanks, for example.

With the hydraulic system 700, one or both sides of the system 700 could be commanded to allow hydraulic fluid to flow independent of the other side and regardless if the third hydraulic cylinder assembly 704 is active and being used.

For example, the raise/lower valve 706A can be selectively opened) to move the piston and rod within the first hydraulic cylinder assembly 204 while the second raise/lower valve 706B can remain closed. During this process the second valve 702A can remain closed.

FIGS. 8A-8D show yet further alternative constructions for the third hydraulic cylinder assembly. These embodiments illustrate one or more springs that can be used to re-center the piston of the third hydraulic cylinder assembly when the working machine returns to a substantially flat surface.

Figure 8A:
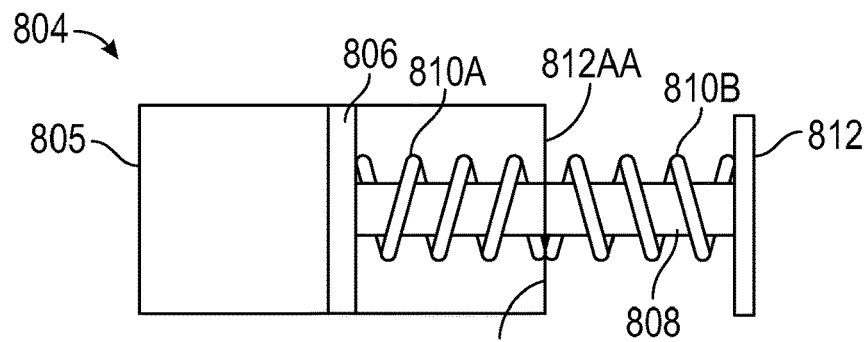
FIGS. 8A-8D show various alternative configurations for a third hydraulic cylinder assembly according to examples of the present application.

FIG. 8A shows a third hydraulic cylinder assembly 804 having a cylinder 805, a piston 806, a rod 808 and a first spring 810A and a second spring 810B. The third hydraulic cylinder assembly 804 can be constructed in the manner previously described with the piston 806 positioned within and moveable relative to the cylinder 705. The rod 808 can connect to the piston 806 and can extend from the cylinder 805. The first spring 810A can be connected to the piston 806 and can extend within the cylinder 805 about or adjacent to the rod 808. The first spring 810A can contact an interior end of the cylinder 812A. The second spring 810B can connect to an exterior end of the cylinder 812AA and can connect to a flange 812 or other feature of the rod 808 or to another component not specifically shown. The second spring 810B can extend about or adjacent to the rod 808.

Figure 8B:
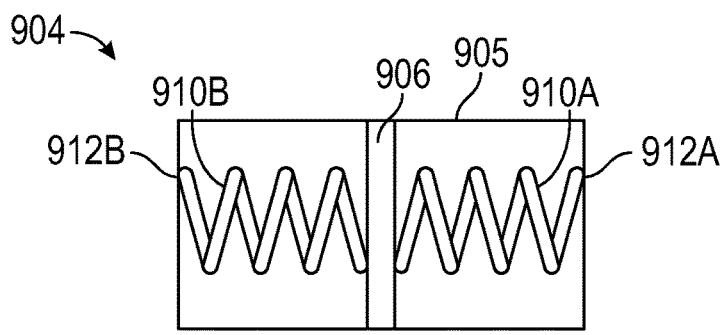

FIG. 8B shows a third hydraulic cylinder assembly 904 having a cylinder 905, a piston 906 and springs 910A and 910B. No rod(s) can be utilized in this embodiment. The third hydraulic cylinder assembly 904 can be constructed in the manner previously described with the piston 906 positioned within and moveable relative to the cylinder 905. The spring 910A can be connected to the piston 906 on a first end and can extend to contact a first end 912A of the cylinder 905. The spring 910B can be connected to the piston 906 on a first end and can extend to contact a second end 912B of the cylinder 905. The first end 912A of the cylinder 905 can oppose the second end 912B of the cylinder 905.

Figure 8C:
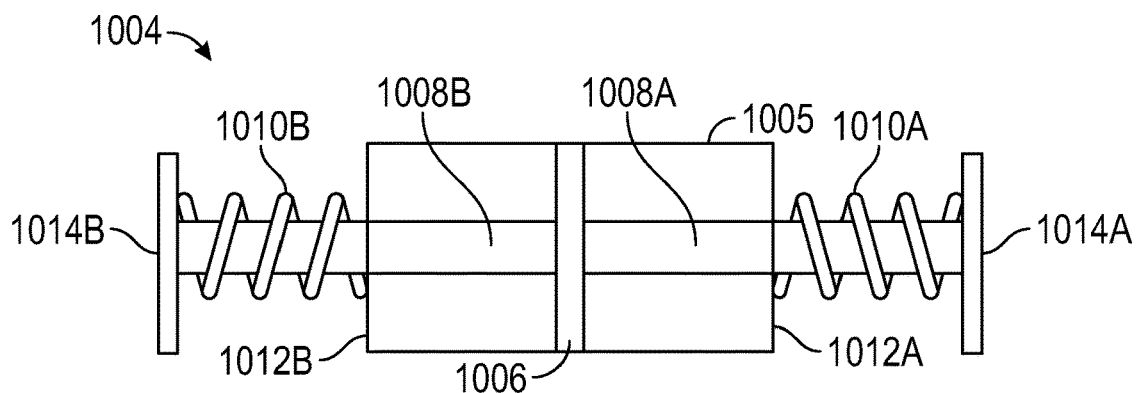

FIG. 8C shows a third hydraulic cylinder assembly 1004 having a cylinder 1005, a piston 1006, rods 1008A and 1008B and springs 1010A and 1010B. The example of FIG. 8C differs from previously embodiments in that two rods 1008A and 1008B are utilized in conjunction with two springs 1010A and 1010B. The springs 1010A and 1010B can be external to the cylinder 1005. The spring 1010A can be connected to a first end 1012A of the cylinder 1005 and can extend about or adjacent to the rod 1008A. The spring 1010A can connect to a flange 1014A or other feature of the rod 1008A or to another component not specifically shown. Similarly, the spring 1010B can be connected to a second end 1012B of the cylinder 1005 and can extend about or adjacent to the rod 1008B. The spring 1010B can connect to a flange 1014B or other feature of the rod 1008B or to another component not specifically shown.

Figure 8D:
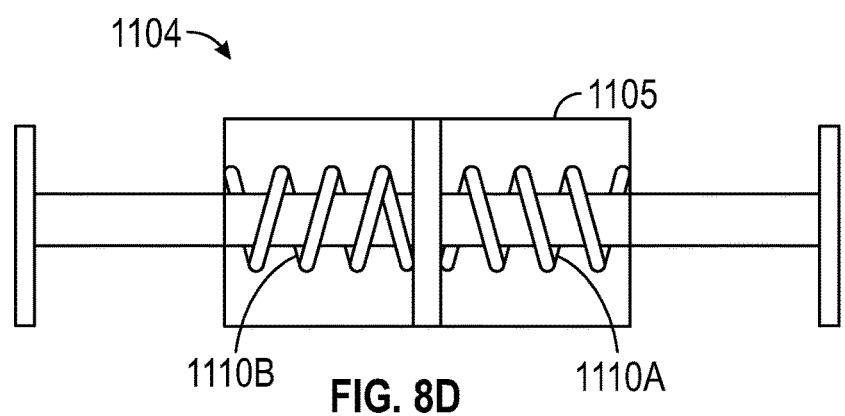

FIG. 8D shows a third hydraulic cylinder assembly 1104 similar to that of the third hydraulic cylinder assembly 1004 of FIG. 8C. The third hydraulic cylinder assembly 1104 differs in that springs 1110A and 1110B are internal to the cylinder 1105 similar to the arrangement described in FIG. 8B.

INDUSTRIAL APPLICABILITY

The present application describes various apparatuses, systems and methods for controlling movement of a frame of a machines relative to propulsion elements or transportation devices. The propulsion elements or transportation devices can be mounted to lifting legs including hydraulic cylinder, that can be controlled with the hydraulic systems disclosed herein. For example, the hydraulic system can include at least two hydraulic cylinder assemblies that can be fluidly coupled to each other such as in a closed-loop manner. The system can have the third hydraulic cylinder assembly, which can be fluidly coupled to the first and second hydraulic cylinder assemblies. As previously discussed, the third hydraulic cylinder assembly can be configured to control a flow of a hydraulic fluid between the first hydraulic cylinder assembly and the second hydraulic cylinder assembly to limit an extent of travel of the first piston of the first hydraulic cylinder assembly and an extent of travel of the second piston of the second hydraulic cylinder assembly. In this manner, the third hydraulic cylinder assembly can be used to limit/control the movement/displacement of first piston and second piston (and additionally the rods connected thereto). The third hydraulic cylinder assembly can be used to achieve a desired maximum displacement position for the first piston and the second position. This desired maximum displacement position can be selected to reduce or eliminate unintended frame loading that can result from operation of the hydraulic system lifting the frame with the first and/or second piston(s) moved to the full stroke/displacement position. This unintended frame loading can make it difficult to maintain a desired slope of the machine. Put another way, the third hydraulic cylinder assembly can be used to allow for some motion in the first and second hydraulic assembly. This motion can be sufficient to prevent a frame twist. The size volume) of the third hydraulic cylinder assembly can be set to limit the amount of travel to the pistons and rods of the first and second hydraulic assembly. By limiting the travel, one can limit the amount of distance side-to-side that the working machine can shift. Thus, the systems discussed herein help maintain a level of working machine stability.

The present systems and methods can be distinguished from suspension systems for ride control such as those of U.S. Pat. No. 6,308,973 to Griebel et al, and that of co-pending U.S. application Ser. No. 16/658,996 in that the present systems and methods do not focus on vibration dampening but rather focus on limiting gross piston travel/displacement that can result in unintended frame loading as further discussed herein.

What is claimed is:

1. A hydraulic system for controlling a hydraulic circuit of a working machine, the hydraulic system comprising:
   a first hydraulic cylinder assembly having a first piston and a first rod for coupling to a first propulsor of the working machine;
   a second hydraulic cylinder assembly having a second piston and a second rod for coupling to a second propulsor of the working machine;
   a third hydraulic cylinder assembly having at least a third piston;
   a first valve configured to selectively fluidly couple the third hydraulic cylinder assembly to the first hydraulic cylinder assembly and the second hydraulic cylinder assembly, wherein when coupled to the first hydraulic cylinder assembly and the second hydraulic cylinder assembly, the third hydraulic cylinder assembly is configured to control a flow of a hydraulic fluid between the first hydraulic cylinder assembly and the second hydraulic cylinder assembly to limit an extent of travel of the first piston and an extent of travel of the second piston.

2. The hydraulic system of claim 1, wherein the third hydraulic cylinder assembly further includes a first rod connected to a first side of the third piston and a second rod connected to a second side of the piston, and wherein the third hydraulic cylinder assembly further includes one or more springs configured to reposition the third piston of the third hydraulic cylinder assembly.

3. The hydraulic system of claim 1, further comprising a second valve configured to regulate the hydraulic fluid to the third hydraulic cylinder assembly to shift a position of the third piston.

4. The hydraulic system of claim 3, further comprising: a sensor for sensing a location of the third piston within the third hydraulic cylinder assembly; and a controller configured to selectively operate the second valve based on input from the sensor to change a position of the third piston within the third hydraulic cylinder assembly.

5. The hydraulic system of claim 4, wherein the controller is configured to selectively operate the first valve.

6. The hydraulic system of claim 1, wherein the third piston is one of free-floating within the third hydraulic cylinder assembly, has one or more rods connected thereto, or has one or more springs in engagement therewith.

7. The hydraulic system of claim 1, further comprising:
a frame of the working machine;
a first leg coupled to the frame and having the first hydraulic cylinder assembly as a part thereof, wherein the first leg via the first hydraulic cylinder assembly is configured to lift the frame relative to the first propulsor; and
a second leg coupled to the frame and having the second hydraulic cylinder assembly as a part thereof, wherein the second leg via the second hydraulic cylinder assembly is configured to lift the frame relative to the second propulsor.

8. The hydraulic system of claim 1, wherein the working machine comprises one of a cold planar or a rotary mixer.

9. A method of controlling movement between adjacent hydraulic devices in a hydraulic circuit for a working machine, the method comprising:
providing or obtaining a first hydraulic device and a second hydraulic device, wherein the first hydraulic device is coupled to first propulsor and configured lift a frame of the working machine relative to the first propulsor, and wherein the second hydraulic device is coupled to a second propulsor and configured to lift the frame of the working machine relative to the second propulsor;
selectively fluidly coupling a third hydraulic device to the first hydraulic device and the second hydraulic device; and
limiting an extent of travel of a first piston of the first hydraulic device and an extent of travel of a second piston of the second hydraulic device with the third hydraulic device when the third hydraulic device is fluidly coupled to the first hydraulic device and the second hydraulic.

10. The method of claim 9, wherein the third hydraulic device comprises a hydraulic cylinder assembly having a piston that is one of free-floating within a cylinder of the hydraulic cylinder assembly, connected to at a first rod or engaged by a spring.

11. The method of claim 10, further comprising at least one of regulating the hydraulic fluid to the third hydraulic cylinder assembly to shift a position of the piston or biasing the piston with the spring.

12. The method of claim 11, further comprising:
sensing a location of the piston with in the cylinder; and
controlling the regulating of the hydraulic fluid to the hydraulic cylinder assembly based upon the sensing the location of the piston to shift the position of the piston.

13. The method of claim 9, wherein the first, second, and third hydraulic device each comprise hydraulic cylinder assemblies and each have at least a piston residing within a cylinder, wherein the third hydraulic device is selectively fluidly coupled between the first hydraulic device and the second hydraulic device, and wherein the piston of the third hydraulic device moves from relatively closer to the first hydraulic cylinder to relatively closer to the second hydraulic cylinder in reaction to a position of the piston of the first hydraulic device changing relative to a position of the piston of the second hydraulic device.

14. A working machine comprising one of a rotary mixer or a cold planar, the working machine comprising:
a frame;
a rotor coupled to the frame and configured to rotate relative thereto;
a propulsion system including a plurality of propulsors, the propulsion system configured to move the working machine;
a first leg coupled to the frame and having a first hydraulic cylinder assembly as a part thereof, wherein the first leg via the first hydraulic cylinder assembly is configured to lift the frame relative to the first propulsor;
a second leg coupled to the frame and having the second hydraulic cylinder assembly as a part thereof, wherein the second leg via the second hydraulic cylinder assembly is configured to lift the frame relative to the second propulsor; and
a hydraulic system including the first hydraulic cylinder assembly having a first piston and the second hydraulic cylinder assembly having a second piston, the hydraulic system further comprising:
a flow control device; and
a first valve configured to selectively fluidly couple a third hydraulic cylinder assembly to the first hydraulic cylinder assembly and the second hydraulic cylinder assembly, wherein when coupled to the first hydraulic cylinder assembly and the second hydraulic cylinder assembly, the flow control device is configured to control a flow of a hydraulic fluid between the first hydraulic cylinder assembly and the second hydraulic cylinder assembly to limit an extent of travel of the first piston and an extent of travel of the second piston.

15. The working machine of claim 14, wherein the flow control device comprises a third hydraulic cylinder assembly that includes a third piston, a first rod connected to a first side of the third piston and a second rod connected to a second side of the piston, and wherein the third hydraulic cylinder assembly further includes one or more springs configured to reposition the third piston of the third hydraulic cylinder assembly.

16. The working machine of claim 14, further comprising at least one of a second valve configured to regulate the hydraulic fluid to the flow control device or one or more springs configured to reposition a piston of the flow control device.

17. The working machine of claim 16, further comprising:
a sensor for sensing a location of a third piston within the flow control device; and a controller configured to selectively operate the second valve based on input from the sensor to change a position of the third piston within the flow control device.

18. The working machine of claim 17, wherein the controller is configured to selectively operate the first valve.

19. The working machine of claim 14, wherein the third piston is free-floating within the flow control device, has one or more rods connected thereto, or has one or more springs in engagement therewith.

\* \* \* \* \*